Figure 2:
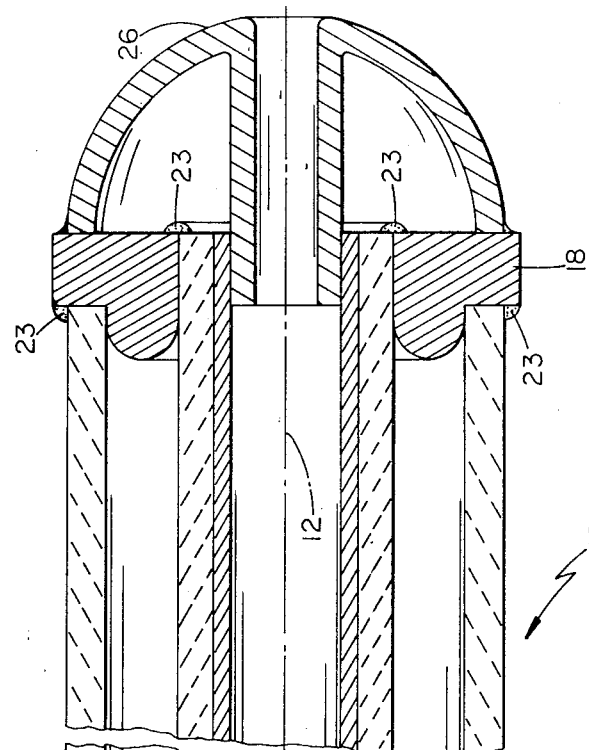

United States Patent [19]
Ceccon et al.

[11] 3,721,851
[45] March 20, 1973

[54] COAXIAL FLASHLAMP

[76] Inventors: Harry L. Ceccon, 7 Bond Street, Boston, 02118; Horace W. Furumoto, 14 Woodridge Road, Wellesley, both of Mass. 02181

[22] Filed: Jan. 31, 1972

[21] Appl. No.: 222,241

[52] U.S. Cl....................................313/201, 313/220
[51] Int. Cl..............................................H01j 61/30
[58] Field of Search..............313/201, 220; 331/94.5

[56] References Cited

UNITED STATES PATENTS 3,262,004  7/1966  Keller...................................313/220

Primary Examiner—Roy Lake
Assistant Examiner—Darwin R. Hostetter
Attorney—Gordon R. Williamson

[57] ABSTRACT

A coaxial flashlamp having a radially outward optical output comprising outer and inner hollow, transparent casings sealed to define an enclosed volume therebetween with an ionizable medium contained in that volume, a first electrode communicating with the medium at a first axial location and a second electrode communicating with the medium at a spaced apart second axial location and connected to an electrically conductive terminal member disposed within the inner casing and extending the axial length of the flashlamp.

7 Claims, 2 Drawing Figures

COAXIAL FLASHLAMP

This invention relates to flashlamps and, more particularly, to flashlamps suitable for optically pumping liquid lasers and similar high performance usages.

Various flashlamp systems have been employed in the past as pumps for organic dye lasers. The relatively slow rise time of linear flashlamps seriously limits the efficiency of these systems. Coaxial flashlamp systems have been proposed; but each suffers from one or more of various disadvantages: e.g., the discharge does not fill the lamp uniformly; the flashlamp has been subject to damage by the laser output; the flashlamp and laser had to be constructed as a single unit and thus the coaxial flashlamps were not suitable as replacements for linear flashlamps in existing systems; etc.

It is a principal object of the present invention to provide a coaxial flashlamp which retains the beneficial features of conventional coaxial flashlamps, but can be used to replace linear flashlamps, which have a radial optical output. It is a further object to provide such a flashlamp which is of simple and convenient design and relatively inexpensive to manufacture.

To achieve these and other objects as will further appear, a flashlamp constructed according to the invention comprises hollow, hermetically sealed, optically transparent inner and outer casings, the inner casing including an inner surface of revolution. The casings are coaxial and hermetically sealed so as to define a completely enclosed volume which contains an ionizable medium. A first electrode communicates with the medium at a first axial region of the volume. A second electrode communicates with the medium at a second axial region of the volume and is connected to an electrically conductive terminal member which is disposed within the inner casing and which has an outer surface of revolution co-axial with the inner surface of the inner casing. The terminal member extends at least the full axial length of the outer casing. In preferred embodiments the inner and outer casings are formed from quartz; the ionizable medium comprises Xenon; the outer surface of the terminal member and the inner surface of the inner casing are in contact throughout their axial length; and the terminal member comprises silver.

Figure 1:
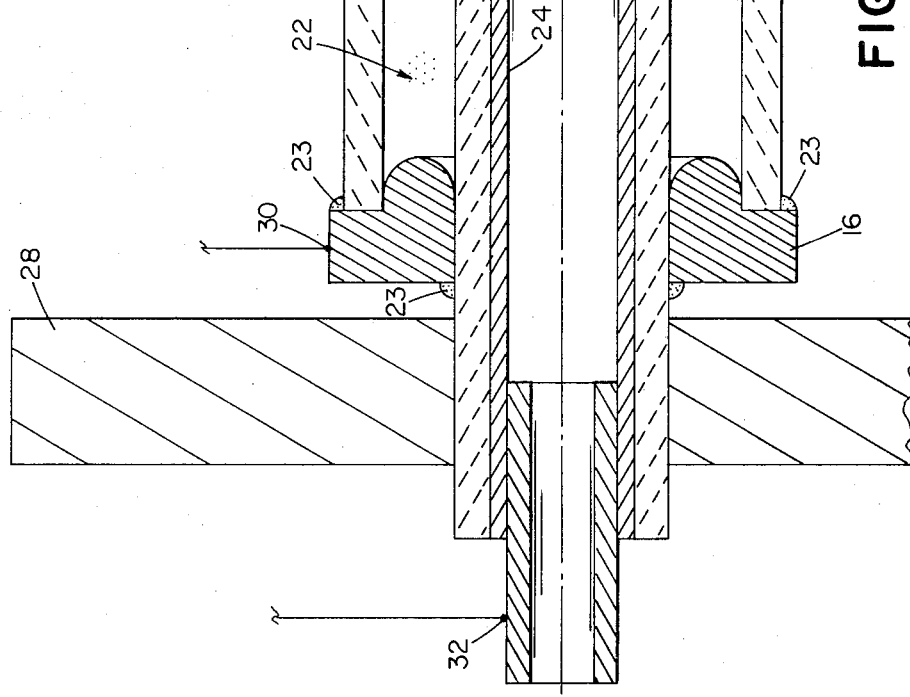

Other objects, features, and advantages of the invention will appear from the following description of particular preferred embodiments taken together with the accompanying drawing. In the drawing:

FIG. 1 is a sectional view along the flashlamp axis of a coaxial flashlamp constructed according to the invention; and, FIG. 2 is a similar sectional view of a portion of an alternative embodiment of a coaxial flashlamp constructed according to the invention.

Referring to FIG. 1, the flashlamp 10 is generally cylindrical in form having an axis of symmetry indicated at 12. An outer casing 14 is provided in the form of a cylindrical quartz tube which is hermetically sealed at its opposite ends to electrically conductive disc electrodes 16, 18. Inner cylindrical quartz tube 20 is hermetically sealed to electrodes 16 and 18 and extends axially beyond the disc 16 (to the left in the drawing). The casings 14 and 20 and the discs 16 and 18 define an enclosed annular volume which is filled with an ionizable gas 22; preferably between 100 and 150 mm Hg of Xenon.

The Xenon gas fills the annular spacing between the outer casing 14 and inner casing 20. The separation between opposed surfaces of the two casings is preferably 0.020 inch. Each of the casings is hermetically sealed to each of the electrodes 16, 18 by means of a conventional, non-conductive epoxy 23 or other quartz-to-metal seals.

Tubular conductive terminal member 24 has its outer surface in contact with the inner surface of casing 20 and extends axially from electrode 18 to a location beyond electrode 16. Conductive cap 26 is formed from materials such as silver and provides electrical connection between electrode 18 and terminal member 24. The cap 26 is symmetrical about axis 12 and has loci of contact with both electrode 18 and terminal member 24 which extend circumferentially around each.

High voltage insulating disc 28 is disposed on the outer surface of casing 20 beyond disc 16. The insulator 28 prevents arcing directly from electrode 16 to the portion of terminal member 24 projecting to the left of the electrode 16. The electrodes 16 and 18 themselves are formed from sputter-resistant lamp electrode materials such as tungsten (75 percent)- copper (25 percent) alloy.

In operation, opposite terminals of a pulsed source of high voltage are connected to electrode 16 (as at 30) and to terminal member 24 at a location 32 to the left of insulator 28 as viewed in FIG. 1.

When a high voltage pulse is applied across the terminals, the ionization threshold of the Xenon will be surpassed and the flashlamp discharge will proceed axially, by means of a photoionization process, along the flashlamp 10 from electrode 16 to electrode 18.

The central axial terminal member 24 is electrically connected to the electrode 18 by means of symmetrical, electrically conductive cap 26. Thus, the terminal member 24 provides a return path for the surge of current which flowed through the Xenon gas 22 during discharge. It is preferred that the outer surface of terminal member 24 be a surface of revolution corresponding in size and shape to the inner surface of casing 20 so as to be in intimate contact therewith. This construction provides for an extremely low inductance for the flashlamp as a whole.

An alternative electrode-and-terminal arrangement is shown in FIG. 2. As shown there, the second electrode comprises a closed-ended, reduced diameter portion 34 of cylindrical terminal member 24a. The electrode is thus in direct contact with the Xenon gas 22 and is integral with the terminal member 24a. The terminal member 24a is sealed to inner quartz casing 20a at 23a and the outer quartz casing 14a has a rounded closed end 36, similar to a conventional "test tube."

Flashlamps constructed according to the invention may vary greatly in details of construction and dimensions. Flashlamps have been built and successfully operated, however, with the following dimensions:

| Length of Flashlamp | O.D. of Inner Casing | Annular Gap |
|---|---|---|
| 5 inches | 0.460 inch | 0.020 inch |
| 2.5 inches | 0.375 inch | 0.020 inch |

It is preferred that the central terminal member 24, in addition to being a good electrical conductor, be highly reflective of the light generated during discharge of the flashlamp. It is for this reason that silver is employed in the preferred embodiments.

The axial terminal member 24, which is in symmetrical close proximity to the annular discharge volume, and the transparent outer casing 14 cooperate to provide an extremely fast, low inductance flashlamp having its optical output directed radially outward from the axis 12 and therefore suitable as a replacement for conventional linear flashlamps, which also have a radial optical output.

While particular preferred embodiments have been shown in the drawing and described in detail, it will be apparent to those skilled in the art that other embodiments are within the scope of the invention and the following claims.

What is claimed is:

1. A coaxial flashlamp comprising
   a hollow, hermetically sealed, optically transparent outer casing;
   a hollow, optically transparent inner casing which includes an inner surface of revolution, is coaxial with said outer casing, and is hermetically sealed so as to define with said outer casing a completely enclosed volume;
   an ionizable medium within said enclosed volume;
   a first electrode communicating with said medium at a first axial region of said volume;
   a second electrode communicating with said medium at a second axial region of said volume spaced apart from said first axial region; and
   a terminal member electrically connected to said second electrode, said terminal member being disposed within said inner casing and having an outer surface of revolution which is co-axial with said inner surface of said inner casing and which extends at least the full axial length of said outer casing.

2. A flashlamp as claimed in claim 1 wherein said outer casing and said inner casing are formed from quartz.

3. A flashlamp as claimed in claim 1 wherein said ionizable medium comprises Xenon.

4. A flashlamp as claimed in claim 1 wherein said outer surface of said terminal member and said inner surface of said inner casing are in contact throughout their axial length.

5. A flashlamp as claimed in claim 4 wherein said terminal member comprises silver.

6. A flashlamp as claimed in claim 1 wherein said terminal member comprises an open-ended cylinder, the circular edge at one end of said terminal member being axially aligned with the circular edge at one end of said inner casing, said flashlamp including a cap member electrically connected to said second electrode and to said terminal member.

7. A flashlamp as claimed in claim 1 wherein said terminal member comprises a metallic tube having a predetermined diameter and said second electrode comprises a reduced diameter, closed-end portion of said metallic tube.

* * * * *